W. N. FISHER.
SANITARY MILK STRAINER.
APPLICATION FILED MAY 10, 1915.
1,188,640.
Patented June 27, 1916.
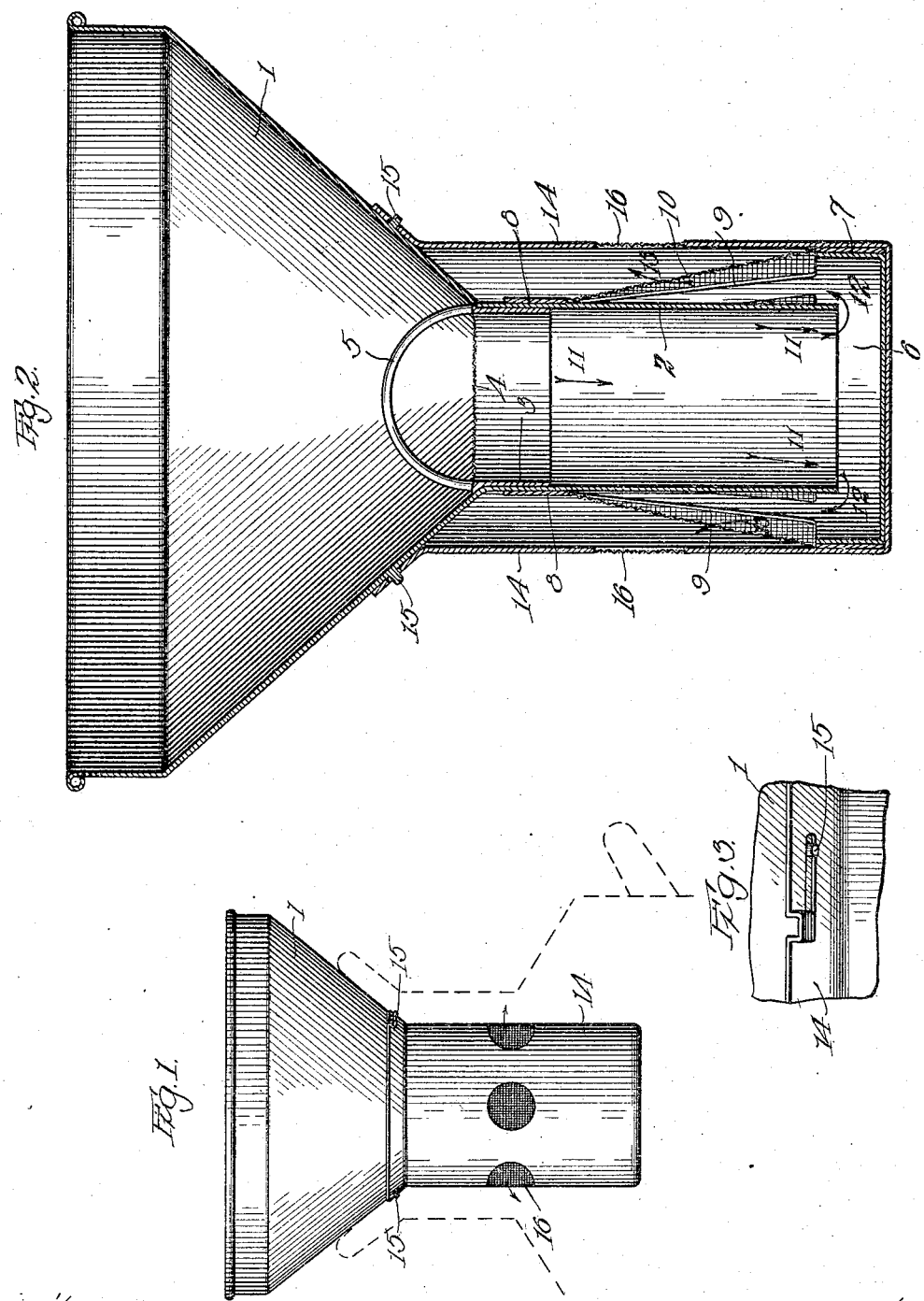
Witnesses:
Leo J. Dumais
W. K. Olson
Inventor:
William N. Fisher
by Clarence Chamberlain
Atty.
THE COLUMBIA PLANOGRAPH CO., WASHINGTON, D. C.

UNITED STATES PATENT OFFICE.

WILLIAM N. FISHER, OF ST. CHARLES, ILLINOIS.

SANITARY MILK-STRAINER.

1,188,640.  Specification of Letters Patent.  Patented June 27, 1916.

Application filed May 10, 1915. Serial No. 27,023.

*To all whom it may concern:*

Be it known that I, WILLIAM N. FISHER, a subject of the King of Denmark, and a resident of the city of St. Charles, in the county of Kane and State of Illinois, have invented certain new and useful Improvements in Sanitary Milk-Strainers, of which the following is a specification.

My invention relates to devices for purifying milk by removing the mechanical impurities therefrom.

The object of my invention is to provide a simple and effective apparatus which is especially adapted to be used in connection with the cans in which milk is ordinarily transported, and by which when the milk is passed therethrough the action of gravity is taken advantage of to separate the mechanical impurities when presented to the further separating action of a series of screens.

The principles of my invention are illustrated in the drawings, in which—

Figure 1 shows a side view of my apparatus, its position in a milk can being indicated by dotted lines; and Fig. 2 is an enlarged view of the apparatus in vertical section.

Further describing the invention with reference to the drawings, 1 is a funnel top having the downwardly projecting tube or spout 2. A screen cap having the walls 3 and the netting cover 4 may be provided for the purpose of removing the coarser foreign bodies, and the handle 5 therefor provides means by which it may readily be removed for the purpose of cleaning. A settling chamber 6 is provided, having a broad base, the bottom of which may be formed by the removable stopper 7. The upper portion is narrowed at 8 to fit closely to the tube 2, and the slanting side walls 9 thereof are provided with panels 10 of screen cloth of very fine mesh. The total area of the said panels is largely in excess of the cross sectional area of the tube 2 and the screen 4 covering the same.

When milk is poured into the upper part 1 of the funnel the coarser impurities are lodged upon the screen 4. The milk passing therethrough follows the direction of the arrows 11, through the tube 2 to the bottom of the settling chamber 6, where particles of dirt or other impurities, heavier in specific gravity than the milk, may be deposited. As the milk passes upward, as indicated by the arrows 12, it comes in contact with the screens 10. As the current of fluid is upward and outward, as indicated by the arrows 13, any particles of dirt or other material which have passed thus far, will be retarded by the said screens. As the said screens have an area much greater than the initial passageway of the fluid presented to them, the flow of fluid therethrough is much slower, and acts much more gently, by reason thereof. This gentle action, as well as the transverse direction across the screens, tends to keep foreign matters out of continual contact therewith and to throw them back into the settling chamber instead of softening and comminuting them and washing them through the screens as would be the case if the current of fluid coincided with the direction of gravity. The milk will be delivered on the other side of the screens with practically all the mechanical impurities removed therefrom. If it is desired still further to take advantage of the action of gravity in purifying the milk, another settling chamber or cup 14 may be provided. It may be secured to the funnel top by a bayonet joint, if desired, as indicated at 15, or by other suitable means. Perforations in the sides thereof are covered with screen 16. These screens also being in a vertical position retard the impurities which might otherwise pass therethrough, while at the same time they are kept washed clean by the flow of fluid thereto. The retarded impurities therefore are caused to sink to the bottom of the second settling tank.

Having thus fully described my invention what I claim as new and desire to secure by Letters Patent is—

1. In a milk strainer; a funnel top, a conductor downwardly extended therefrom, a settling chamber provided with a removable bottom and having flaring side walls inclosing said conductor and extending therebelow, and screens having a combined area in excess of the cross sectional area of the conductor secured in the side walls of the settling chamber above the bottom thereof.

2. In a milk strainer; a funnel top, a conductor downwardly extended therefrom, a settling chamber having a removable bottom and provided with side walls to inclose said conductor and receive the flow of fluid therefrom, screens secured in the side walls of the settling chamber above the bottom thereof, a second settling chamber to inclose the first settling chamber and support said removable bottom thereof, means to secure said second settling chamber to the funnel top, and screens in the vertical walls of the second settling chamber.

In witness whereof, I have hereunto subscribed my name in the presence of two subscribing witnesses, this 29th day of April 1915.

WILLIAM N. FISHER.

Witnesses:
C. K. CHAMBERLAIN,
ROBERT LEE CHAMBERLAIN.

Copies of this patent may be obtained for five cents each, by addressing the "Commissioner of Patents, Washington, D. C."